(12) United States Patent
Hashimoto (10) Patent No.: US 8,206,865 B2
(45) Date of Patent: Jun. 26, 2012

(54) SEPARATOR FOR FUEL CELL (75) Inventor: Keiji Hashimoto, Aichi-ken (JP)

(73) Assignee: Toyota Shatai Kabushiki Kaisha (JP)

( * ) Notice: Subject to any disclaimer, the term of this patent is extended or adjusted under 35 U.S.C. 154(b) by 853 days.

(21) Appl. No.: 12/067,620

(22) PCT Filed: Jul. 13, 2006

(86) PCT No.: PCT/JP2006/314331
§ 371 (c)(1),
(2), (4) Date: Mar. 20, 2008

(87) PCT Pub. No.: WO2007/034617
PCT Pub. Date: Mar. 29, 2007

(65) Prior Publication Data
US 2009/0155665 A1  Jun. 18, 2009

(30) Foreign Application Priority Data
Sep. 22, 2005 (JP) .................. 2005-274926

(51) Int. Cl.
*H01M 8/04* (2006.01)
(52) U.S. Cl. ........ 429/437; 429/434; 429/514; 429/459; 429/465; 429/457
(58) Field of Classification Search .......... 429/39, 429/34, 514, 424, 444, 0.434, 437, 459, 465, 429/457; 204/284
See application file for complete search history.

(56) References Cited

U.S. PATENT DOCUMENTS 5,063,123 A * 11/1991 Ohsuga et al. ............... 429/456
6,171,719 B1 1/2001 Roy et al.
6,335,112 B1 * 1/2002 Asukabe et al. ............. 429/494
6,410,177 B1 * 6/2002 Iyasu et al. .................. 429/434
6,500,319 B2 * 12/2002 LaConti et al. .............. 204/263
6,692,858 B2 * 2/2004 Higuchi et al. .............. 429/494

(Continued)

FOREIGN PATENT DOCUMENTS

DE    102005019579 A1    12/2005

(Continued)

OTHER PUBLICATIONS

International search report issued in corresponding application PCT/JP2006/314331, mailed on Jan. 8, 2007.

(Continued)

*Primary Examiner* — Patrick Ryan
*Assistant Examiner* — Alex Usyatinsky
(74) *Attorney, Agent, or Firm* — Rossi, Kimms & McDowell LLP (57) ABSTRACT

A separator includes a separator body 11 and a collector 12. The separator body 11 prevents a mixed flow of fuel gas and oxidizer gas. The collector 12 is formed from a metal lath RM in which through holes each having an opening shape assuming the form of a hexagon are formed in a meshy, step-like arrangement. This establishes a substantially linear contact mode between the collector 12 and each of the separator body 11 and a carbon cloth CC superposed on an MEA 30. This contact mode increases a contact area between the carbon cloth CC and gas and allows a necessary and sufficient contact area between the carbon cloth CC and the separator body 11. Thus, gas can be supplied efficiently, and generated electricity can be collected efficiently to thereby improve electricity generation efficiency of a fuel cell.

11 Claims, 9 Drawing Sheets

U.S. PATENT DOCUMENTS

| | | | |
|---|---|---|---|
| 7,153,602 B2 * | 12/2006 | Kubota et al. | 429/444 |
| 7,326,486 B2 * | 2/2008 | Hibino et al. | 429/514 |
| 2005/0244702 A1 | 11/2005 | Horiguchi | |
| 2009/0089989 A1 | 4/2009 | Hashimoto et al. | |
| 2010/0151359 A1 | 6/2010 | Tanaka et al. | |

FOREIGN PATENT DOCUMENTS

| | | | |
|---|---|---|---|
| EP | 1095174 A1 | 5/2001 | |
| EP | 1353391 A1 | 10/2003 | |
| GB | 2400723 A | 10/2004 | |
| JP | 7-22037 A | 1/1995 | |
| JP | 08-138701 A | 5/1996 | |
| JP | 2000-58072 A | 2/2000 | |
| JP | 2000-58073 A | 2/2000 | |
| JP | 2000-210733 A | 8/2000 | |
| JP | 2000-273874 A | 10/2000 | |
| JP | 2001-47153 A | 2/2001 | |
| JP | 3077424 U | 2/2001 | |
| JP | 2002-184422 A | 6/2002 | |
| JP | 2002-191987 A | 7/2002 | |
| JP | 2002-519508 A | 7/2002 | |
| JP | 2003-518711 A | 6/2003 | |
| JP | 2004-311043 A | 11/2004 | |
| JP | 2005-310633 A | 11/2005 | |
| JP | 2006-253036 A | 9/2006 | |
| JP | 2006-294404 A | 10/2006 | |
| JP | 2007-087768 A | 4/2007 | |
| JP | 2007-214020 A | 8/2007 | |
| WO | 9967447 A | 12/1999 | |
| WO | 9967447 A1 | 12/1999 | |
| WO | 2007-034617 A1 | 3/2007 | |
| WO | 2007-091718 A1 | 8/2007 | |

OTHER PUBLICATIONS

Written opinion issued in corresponding application PCT/JP2006/314331, mailed on Jan. 8, 2007.

Japanese Office Action in corresponding JP 2005-274926, dated Jul. 19, 2011.

Collins English Dictionary—Complete and Unabridged © Harper Collins Publishers 1991, 1994, 1998, 2000, 2003. Cited in related co-pending U.S. Appl. No. 12/519,118 (see USPGP Cite No. 2).

* cited by examiner

FIRST BOND PORTION

SECOND BOND PORTION

FIRST BOND PORTION

SECOND BOND PORTION

SEPARATOR FOR FUEL CELL

TECHNICAL FIELD

The present invention relates to a separator for use in a fuel cell, particularly, a polymer electrolyte fuel cell.

BACKGROUND ART

Generally, a polymer electrolyte fuel cell includes a membrane-electrode assembly which, in turn, includes an anode electrode layer formed on one side thereof and a cathode electrode layer formed on the other side thereof. Fuel gas (e.g., hydrogen gas) and oxidizer gas (e.g., air) are supplied to the anode electrode layer and the cathode electrode layer, respectively, via respective separators. Supply of fuel gas and oxidizer gas to the anode electrode layer and the cathode electrode layer induces electrode reactions in the membrane-electrode assembly, thereby generating electricity. Electricity generated in the membrane-electrode assembly is output to the exterior of the fuel cell via the separators.

The polymer electrolyte fuel cell generates electricity efficiently by means of efficiently supplying fuel gas and oxidizer gas to the membrane-electrode assembly; more specifically, to the anode electrode layer and the cathode electrode layer, so as to accelerate electrode reactions in the membrane-electrode assembly. Efficient collection of electricity generated in the membrane-electrode assembly allows efficient output of generated electricity to the exterior of the fuel cell.

In order to achieve the above-mentioned efficient generation of electricity, the polymer electrolyte fuel cell employs separators which are formed of a metal sheet impermeable to gas and on which a large number of streaky recesses and projections are formed. In the conventional separators, externally supplied fuel gas and oxidizer gas flow through streaky recess portions (or projection portions) thereof to thereby be supplied to the anode electrode layer and the cathode electrode layer. Thus, limitations are imposed on a contact area between supplied fuel gas and the anode electrode layer and that between supplied oxidizer gas and the cathode electrode layer, possibly resulting in a failure to sufficiently supply fuel gas and oxidizer gas. By contrast, a contact area between the anode electrode layer and the corresponding separator and that between the cathode electrode layer and the corresponding separator are provided in excess, so that the separators can collect generated electricity with very high efficiency.

As mentioned above, a separator which has conventionally been employed in the polymer electrolyte fuel cell is inferior in terms of efficient supply of gas, but is superior in terms of efficient collection of electricity. In other words, gas supply efficiency and electricity collection efficiency are not appropriately balanced.

In order to cope with the above problem, for example, Patent Document 1 discloses a separator for a fuel cell which exhibits improved gas supply efficiency. This separator for a fuel cell includes a flat-sheet-like first member (carbon) and a second member (sheet metal) which is superposed on the first member and has a plurality of protruding pieces to elastically contact an anode electrode layer or a cathode electrode layer and to form a gas passageway. The gas passageway formed by means of the plurality of protruding pieces of the second member assume the form of spaces around and behind the protruding pieces, thereby allowing externally supplied fuel gas or oxidizer gas to pass therethrough in every direction.

Thus, the disclosed separator can well diffuse fuel gas or oxidizer gas and can enhance efficiency in gas supply to the anode electrode layer or the cathode electrode layer. In the separator, the protruding pieces of the second member come into surface contact with the anode electrode layer or the cathode electrode layer; thus, the separator can collect generated electricity efficiently. The separator outputs generated electricity to the exterior of the fuel cell via the first member.

The disclosed conventional separator for a fuel cell can well diffuse fuel gas or oxidizer gas. However, since the protruding pieces of the second member are actively brought into surface contact with the anode electrode layer or the cathode electrode layer by utilization of elasticity, a contact area between diffused fuel gas and the anode electrode layer or between diffused oxidizer gas and the cathode electrode layer is reduced. In other words, the area of surface portions of the anode electrode layer or the cathode electrode layer covered with the second member increases, possibly resulting in a failure to supply gas to the anode electrode layer or the cathode electrode layer in an amount required for an electrode reaction. Thus, in this respect, there remains room for improvement.

In order to cope with the above problem, for example, Patent Document 2 discloses a fuel cell in which gas supply efficiency is improved. In this fuel cell, fuel gas and oxidizer gas are supplied to an anode electrode layer and a cathode electrode layer, respectively, via a porous metal (nickel foam). This reduces a contact area between the anode electrode layer and the corresponding porous metal and that between the cathode electrode layer and the corresponding porous metal, thereby allowing supply of gas in an amount required for an electrode reaction. Also, the anode electrode layer and the surface of the corresponding porous metal contact each other, and the cathode electrode layer and the surface of the corresponding porous metal contact each other, thereby securing a contact area required for efficiently collecting generated electricity. Thus, electricity collection efficiency is improved.

However, generally, the cost of manufacturing porous metal is very high; thus, the cost of manufacturing a fuel cell which employs porous metal increases. Therefore, there is urgent demand for development of a separator which enhances gas supply efficiency and electricity collection efficiency and whose manufacturing cost is low.

Patent Document 1: Japanese Patent Application Laid-Open (kokai) No. 2002-184422

Patent Document 2: Japanese Patent Application Laid-Open (kokai) No. 07-22037

DISCLOSURE OF THE INVENTION

The present invention has been achieved for solving the above problems, and an object of the invention is to provide a separator for a fuel cell which allows good supply of gas and efficient collection of generated electricity to thereby improve electricity generation efficiency of the fuel cell.

To achieve the above object, according to a feature of the present invention, a separator for a fuel cell for supplying fuel gas and oxidizer gas to respective electrode layers of an electrode structure of the fuel cell and for collecting electricity generated through electrode reactions in the electrode layers comprises a flat-sheet-like separator body formed from an electrically conductive material and preventing mixed flow of the fuel gas and the oxidizer gas, through separation of the fuel gas and the oxidizer gas from each other, and a collector formed from a metal lath having a large number of through holes, each having a predetermined opening shape, formed in a meshy, step-like arrangement, forming a gas passageway between the separator body and each of the electrode layers for supplying the fuel gas or the oxidizer gas to the electrode layer, and collecting electricity generated through electrode reactions in the electrode layers. In this case, preferably, a contact area between the collector and the electrode layer is equal to or greater than a contact area between the collector and the separator body. Preferably, the predetermined opening shape of the individual through holes of the collector assumes the form of, for example, a hexagon, a pentagon, or a quadrangle. Preferably, the collector forms the gas passageway such that a flow direction of the fuel gas or the oxidizer gas to be supplied coincides with a forming direction of the metal lath.

Through employment of the above structural features, the collector can be formed from a metal lath in which through holes each having a predetermined opening shape assuming the form of a hexagon or the like are formed in a meshy, step-like arrangement. This enhances gas supply efficiency in terms of supply of fuel gas or oxidizer gas to the electrode layer and allows improved efficiency in collection of electricity generated through electrode reactions in the electrode layers.

That is, by means of forming the collector from a metal lath in which through holes each having a predetermined opening shape are formed in a meshy, step-like arrangement, a contact state (mode) between the collector and the electrode layer (i.e., the anode electrode layer or the cathode electrode layer) can be virtually linear or dot-like. This increases the area of contact (contact area) between the electrode layer and supplied fuel gas or oxidizer gas, thereby allowing sufficient supply of gas required for electrode reactions in the electrode layers.

Electricity generated in the electrode layer flows from the surface of the electrode layer to the collector and is then output from the collector to the exterior of the fuel cell via the separator body. At this time, although a contact state (mode) between the collector and the electrode layer and that between the collector and the separator body are virtually linear or dot-like, a necessary and sufficient contact area for flow of electricity can be secured. This lowers resistance associated with flow of generated electricity, so that electricity can be collected efficiently. Therefore, the fuel cell can output electricity efficiently to the exterior thereof.

In order to allow passage of gas, the collector does not need to have, for example, streaky recesses and projections or protruding pieces for forming a gas passageway. Thus, the collector can be formed very easily, thereby enhancing productivity. Since formation of a gas passageway is not necessary, the thickness of the collector can be reduced. This reduces the thickness of a single cell, which is a basic unit of the fuel cell, thereby implementing a small-sized fuel cell.

According to another feature of the present invention, a plurality of metal laths are stacked to form the collector. In this case, preferably, the plurality of metal laths to be stacked differ in the ratio of total opening area of through holes to a surface area.

Employment of the above structural features allows an increase in space through which fuel gas or oxidizer gas flows; i.e., space between the separator body and the electrode layer, thereby allowing increased flow of fuel gas or oxidizer gas. Thus, gas required for electrode reactions in the electrode layers can be supplied sufficiently. Also, in this case, since a necessary and sufficient contact area is provided between the collector and the electrode layer and between the collector and the separator body, generated electricity can be collected efficiently.

Also, the metal laths to be stacked can differ in the ratio of total opening area of through holes to a surface area; i.e., collector components can differ in opening percentage. This readily allows a change in a contact area between the electrode layer and the collector and a change in supply of fuel gas or oxidizer gas. Therefore, the contact area and the gas supply can be optimized in accordance with required specifications of the fuel cell.

BEST MODE FOR CARRYING OUT THE INVENTION

Figure 1:
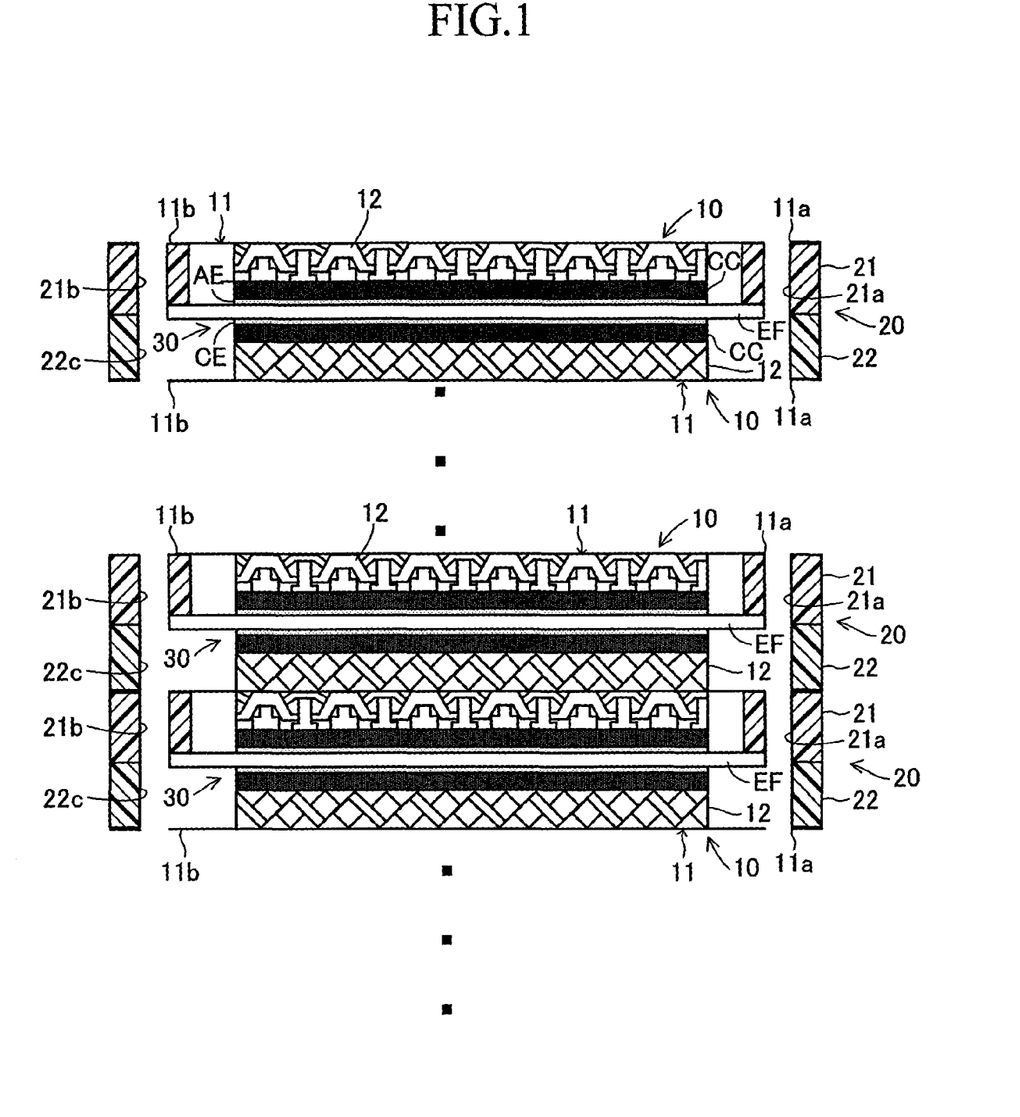
FIG. 1 is a schematic view partially showing a fuel cell stack which employs separators for a fuel cell according to an embodiment of the present invention.

An embodiment of the present invention will next be described in detail with reference to the drawings. FIG. 1 is a sectional view schematically showing a portion of a polymer electrolyte fuel cell stack which employs separators 10 for a fuel cell (hereinafter, referred to merely as the separators 10) according to the present embodiment. The fuel cell stack is a stack of cells. A single cell includes two separators 10, two frames 20, and an MEA 30 (Membrane-Electrode Assembly 30). The frames 20 and the MEA 30 are disposed in layers between the separators 10.

When, for example, fuel gas such as hydrogen gas, and oxidizer gas such as air are introduced to the cells from the exterior of the fuel cell stack, electrode reactions occur in the MEAs 30, thereby generating electricity. Hereinafter, fuel gas and oxidizer gas may be collectively referred to as gas.

As shown in FIG. 1, each of the separators 10 includes a separator body 11 for preventing a mixed flow of gas introduced into the fuel cell stack, and a collector 12 for uniformly diffusing externally supplied gas to the MEA 30 and for collecting electricity generated through electrode reactions.

The separator body 11 is formed from a sheet metal (e.g., a stainless steel sheet having a thickness of about 0.1 mm). Another applicable sheet metal is, for example, a steel sheet which has undergone anticorrosive treatment such as gold plating. In place of a sheet metal, an electrically conductive nonmetal material (e.g., carbon) may also be used to form the separator body 11.

Figure 2:
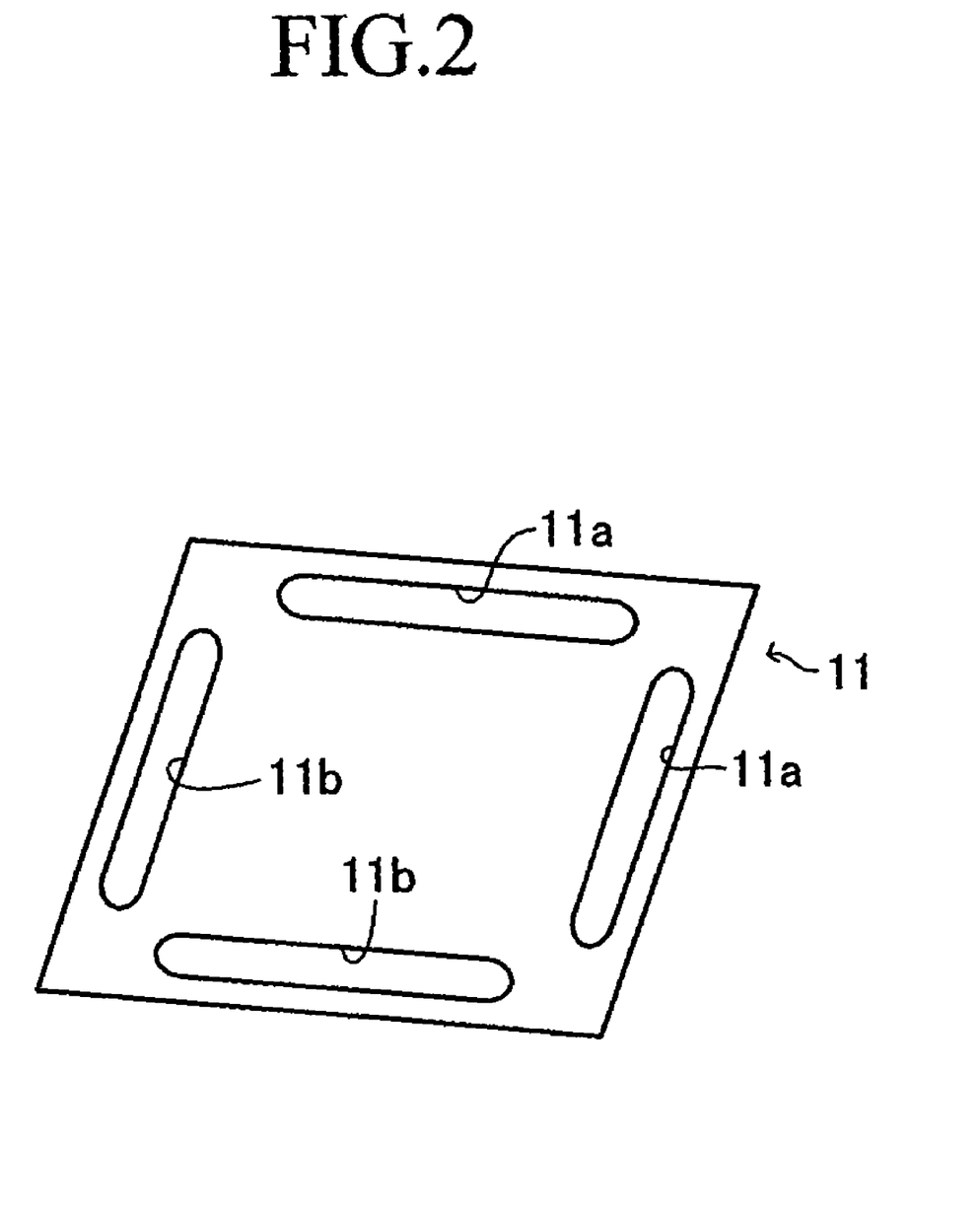
FIG. 2 is a schematic, perspective view showing a separator body of each of the separators of FIG. 1.

As shown in FIG. 2, the separator body 11 is formed into a virtually square, flat-sheet-like shape. Two gas inlets 11a and two gas outlets 11b are formed in a peripheral region of the separator body 11 in such a manner that the gas inlets 11a face the corresponding gas outlets 11b. A pair consisting of the gas inlet 11a and the gas outlet 11b is oriented virtually orthogonal to the other pair consisting of the gas inlet 11a and the gas outlet 11b.

Each of the gas inlets 11a of the separator body 11 assumes the form of an elongated through hole and allows fuel gas or oxidizer gas supplied from the exterior of the fuel cell stack to be introduced therethrough into the corresponding cell and to flow therethrough so as to be supplied to other stacked cells. Each of the gas outlets 11b of the separator body 11 also assumes the form of an elongated through hole and allows discharge, to the exterior of the fuel cell stack, of gas which has been introduced into the corresponding cell but remains unreacted in the MEA 30, as well as unreacted gas from other stacked cells.

Figure 3A:
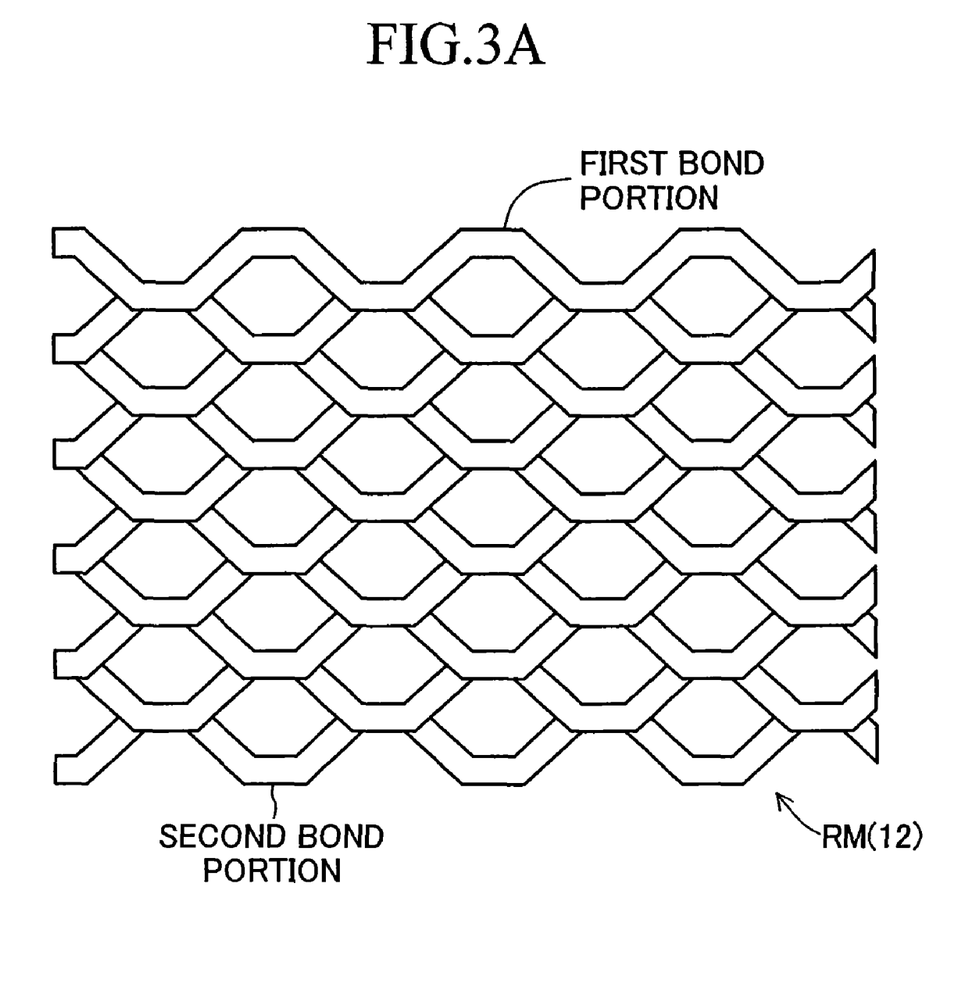
FIGS. 3A and 3B are views for explaining a metal lath used to form the collector.
Figure 3B:
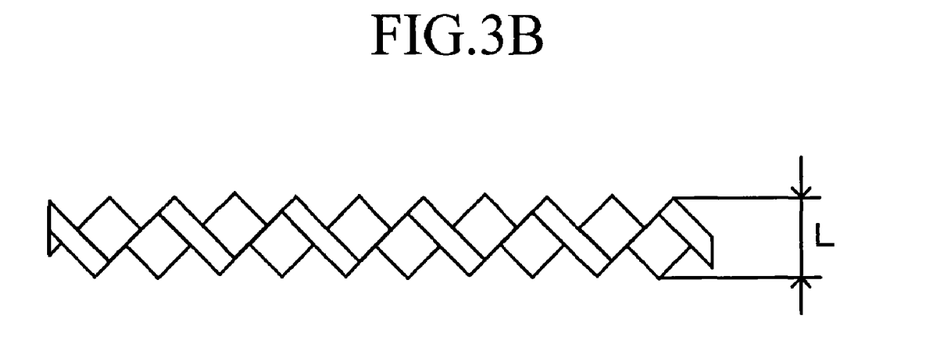

The collector 12 is formed from a sheet metal having a large number of small-diameter through holes, each having a predetermined shape, formed in a meshy arrangement (hereinafter, this sheet metal is called a metal lath RM). This metal lath RM is formed by subjecting, for example, a stainless steel sheet having a thickness of about 0.1 mm to lath machining. As shown in FIG. 3A, lath machining forms through holes each having a virtually hexagonal shape (hereinafter, these through holes are called hexagonal through holes) in a meshy arrangement. In the metal lath RM, portions which form the hexagonal through holes (hereinafter, these portions are called strands) are sequentially linked in an overlapping manner (hereinafter, these linked portions are called bond portions); thus, as shown in FIG. 3B, which is a side view of FIG. 3A, the metal lath RM has a step-like cross section. Next will be described lath machining for forming the metal lath RM.

Figure 4A:
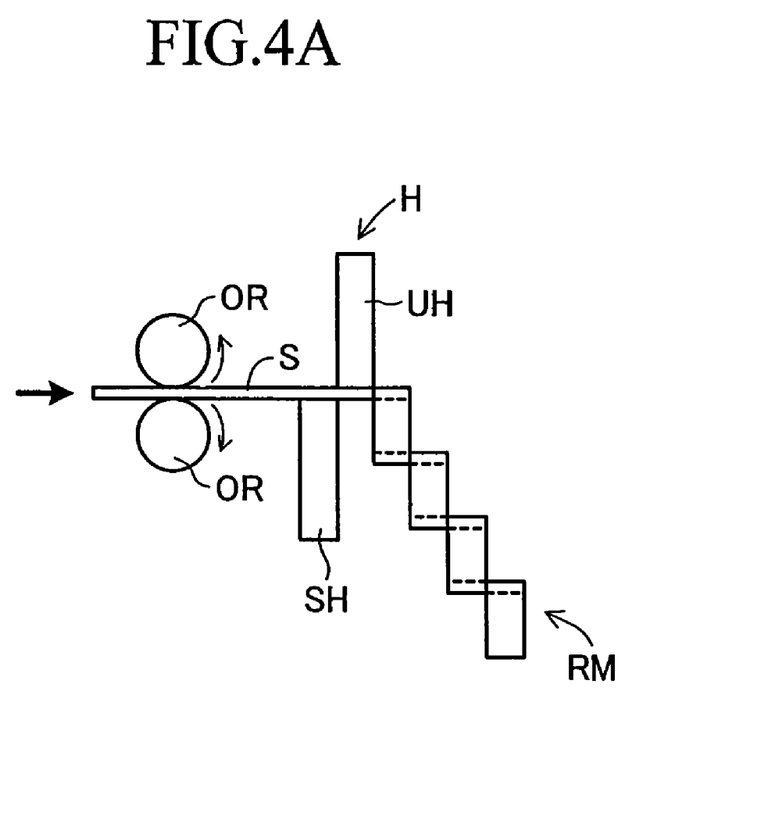
FIG. 4A is a schematic view showing a lath machining apparatus for forming the metal lath of FIGS. 3A and 3B.
Figure 4B:
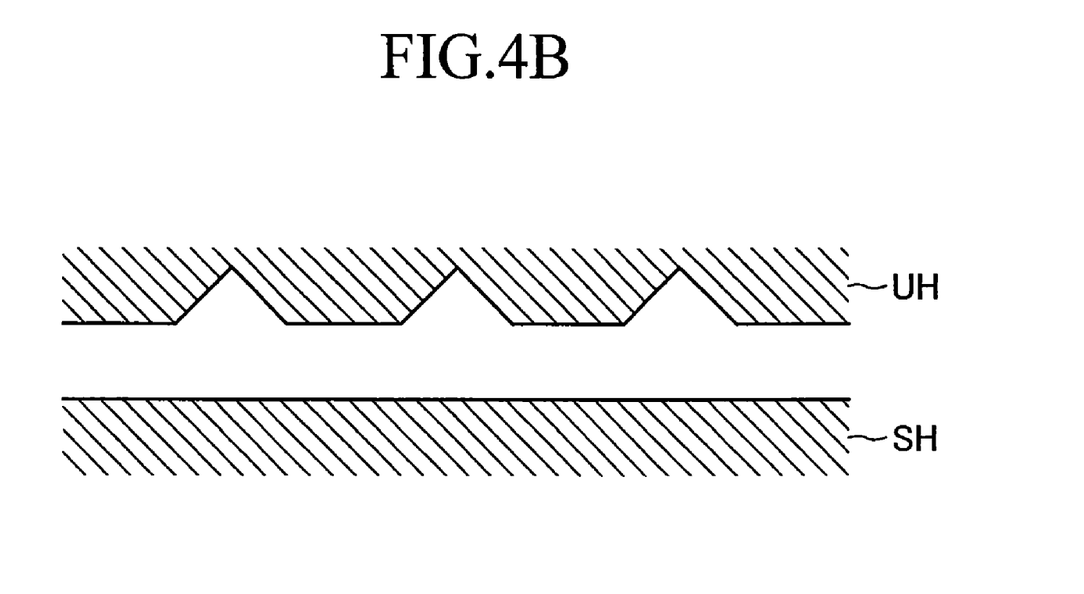
FIG. 4B is a view for explaining the shape of a blade stamp of FIG. 4A.

The metal lath RM is formed by use of a lath machining apparatus A, which is schematically shown in FIG. 4A. The lath machining apparatus A includes a feed roller OR for feeding a stainless steel sheet S, and a blade stamp H for sequentially shearing the stainless steel sheet S so as to form hexagonal through holes in a meshy arrangement. The stainless steel sheet S may assume the form of a precut sheet having a predetermined length or the form of a coil. As shown in FIG. 4B, the blade stamp H consists of an upper blade UH which can move in vertical and horizontal directions, and a lower blade SH which is attached to a base. The upper blade UH and the lower blade SH form cuts in the stainless steel sheet S in a staggered arrangement by shearing, and the upper blade UH has a plurality of generally trapezoidal cutting edges for forming hexagonal through holes in the stainless steel sheet S in a step-like arrangement.

In the thus-configured lath machining apparatus A, first, the feed roller OR feeds the stainless steel sheet S to the blade stamp H by a predetermined machining length (machining pitch). When the feed roller OR feeds the stainless steel sheet S to the blade stamp H, the upper blade UH of the blade stamp H lowers toward the lower blade SH and partially shears the stainless steel sheet S by means of the generally trapezoidal cutting edges and in cooperation with the lower blade SH, thereby forming cuts in the stainless steel sheet S. The upper blade UH further lowers to the bottom position of its stroke, thereby bending and expanding downward a portion of the stainless steel sheet S which is in contact with the upper blade UH. The shape of the upper blade UH; i.e., the generally trapezoidal shapes, is transferred to the bent and expanded portion of the stainless steel sheet S. Then, the upper blade UH returns from the bottom position to the upper origin position of its stroke.

Subsequently, the feed roller OR feeds again the stainless steel sheet S to the blade stamp H by a machining pitch. At this time, the upper blade UH moves (i.e., is offset) in a horizontal direction by half a pitch. Then, the upper blade UH lowers again as mentioned above. This performs the above-mentioned cutting work and bending-expanding work on a portion of the stainless steel sheet S which is offset in a horizontal direction by half a pitch from the previously bent and expanded portion of the stainless steel sheet S. As a result, the hexagonal through holes are formed in the stainless steel sheet S.

Repeating the above-mentioned operations forms continuously the metal lath RM in which a large number of hexagonal through holes are formed in a staggered arrangement; i.e., in a meshy arrangement. Since the upper blade UH has a plurality of generally trapezoidal cutting edges, lowering the upper blade UH leaves cut-free portions on the stainless steel sheet S. The cut-free portions of the stainless steel sheet S become bond portions of the metal lath RM, whereby the strands are sequentially linked in an overlapping manner. Thus, the metal lath RM is formed such that its cross section has a step-like shape as shown in FIG. 3B. The metal lath RM is cut so as to have predetermined dimensions, thereby forming the collector 12.

Figure 5:
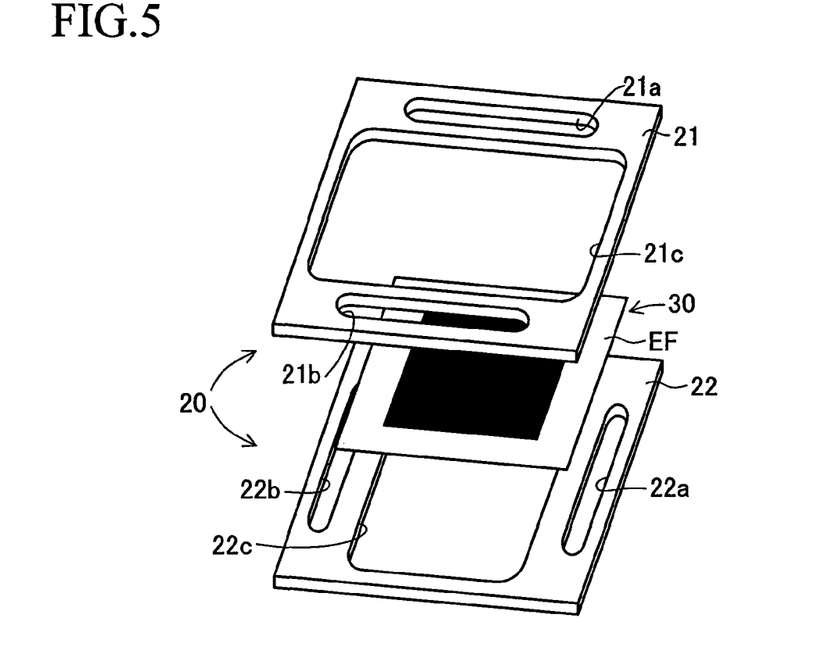
FIG. 5 is a schematic, perspective view for explaining a state of assembly of frames and an MEA shown in FIG. 1.

As shown in FIGS. 1 and 5, a frame 20 consists of two resin sheet bodies 21 and 22 of the same structure. One surface of each of the resin sheet bodies 21 and 22 is fixedly attached to the MEA 30, and the other surface is fixedly attached to the corresponding separator body 11. The resin sheet bodies 21 and 22 have outside dimensions approximately identical with those of the separator body 11 and a thickness slightly smaller than a forming height L of the collector 12 shown in FIG. 3B. The resin sheet bodies 21 and 22 are disposed in such a manner as to differ in an angular orientation by about 90 degrees.

Through holes 21a and 21b which correspond to and are shaped virtually similar to the gas inlet 11a and the gas outlet 11b (both formed in the separator body 11), respectively, are formed in a peripheral region of the resin sheet body 21, and through holes 22a and 22b which correspond to and are shaped virtually similar to the gas inlet 11a and the gas outlet 11b, respectively, are formed in a peripheral region of the resin sheet body 22. In a state where a single cell is formed as will be described later, the through holes 21a, 21b, 22a, and 22b positionally coincide with the corresponding gas inlets 11a and gas outlets 11b. Accommodation holes 21c and 22c for accommodating the respective collectors 12 are formed in virtually central regions of the resin sheet bodies 21 and 22, respectively. In the form of a single cell, the accommodation hole 21c of the resin sheet body 21 communicates with a pair consisting of the gas inlet 11a and the gas outlet 11b of each of the two separator bodies 11 and with the through holes 22a and 22b of the resin sheet body 22, whereas the accommodation hole 22c of the resin sheet body 22 communicates with the other pair consisting of the gas inlet 11a and the gas outlet 11b of each of the two separator bodies 11 and with the through holes 21a and 21b of the resin sheet body 21.

As a result of formation of the accommodation hole 21c (22c), the lower surface (upper surface) of the attached separator body 11, the inner peripheral surface of the accommodation hole 21c (22c), and the upper surface (lower surface) of the MEA 30 define a space (hereinafter, called a gas flow space). For example, fuel gas can be introduced into the gas flow space associated with the accommodation hole 21c through one gas inlet 11a, whereas oxidizer gas can be introduced into the gas flow space associated with the accommodation hole 22c through the other gas inlet 11a and through the through hole 21a. Also, unreacted fuel gas can be discharged to the exterior of the fuel cell stack through one gas outlet 11b, whereas unreacted oxidizer gas can be discharged to the exterior of the fuel cell stack through the through hole 21b and through the other gas outlet 11b.

As shown in FIGS. 1 and 5, the MEA 30, which serves as an electrode structure, is configured such that predetermined catalyst layers are formed on respective sides of an electrolyte membrane EF; more specifically, an anode electrode layer AE is formed close to the gas flow space into which fuel gas is introduced, and a cathode electrode layer CE is formed close to the gas flow space into which oxidizer gas is introduced. Since actions (electrode reactions) of the electrolyte membrane EF, the anode electrode layer AE, and the cathode electrode layer CE are not directly related to the present invention, detailed description thereof is omitted.

The size of the electrolyte membrane EF is determined so as to be greater than a generally square opening which is formed when the resin sheet bodies 21 and 22 of the frame 20 are superposed on each other, and so as not to cover the through holes 21a and 21b and the through holes 22a and 22b when the electrolyte membrane EF is sandwiched between the resin sheet bodies 21 and 22. Such formation of the electrolyte membrane EF prevents leakage of gas introduced into one gas flow space into the other gas flow space (so-called crossleak). The anode electrode layer AE and the cathode electrode layer CE, which serve as electrode layers, are slightly smaller in size than the generally square opening which is formed when the resin sheet bodies 21 and 22 of the frame 20 are superposed on each other.

An exposed surface of each of the anode electrode layer AE and the cathode electrode layer CE is covered with a carbon cloth CC formed from electrically conductive fiber. The carbon cloth CC is adapted to uniformly supply fuel gas or oxidizer gas supplied into the gas flow space to an associated electrode layer and to efficiently supply electricity generated through electrode reactions to the associated collector 12. Since the carbon cloth CC is fibrous, supplied gas flows through interfiber space to thereby be uniformly diffused. Since the carbon cloth CC is electrically conductive, the carbon cloth CC allows efficient flow of generated electricity to the associated collector 12. The carbon cloths CC may be eliminated as needed.

A single cell is formed by arranging in layers the two separator bodies 11, the two collectors 12, the frame 20, and the MEA 30. Specifically, as shown in FIG. 5, the MEA 30 is disposed between the resin sheet bodies 21 and 22 of the frame 20 which are disposed in such a manner as to differ in an angular orientation by about 90 degrees. The thus-arranged elements are joined together, for example, through application of adhesive such that the electrolyte membrane EF of the MEA 30 is sandwiched between the resin sheet bodies 21 and 22 of the frame 20.

The two collectors 12 are fitted into the resultant assembly of the frame 20 and the MEA 30; more specifically, the two collectors 12 are fitted into the respective accommodation holes 21c and 22c of the resin sheet bodies 21 and 22 of the frame 20. At this time, the two collectors 12 are accommodated in the respective accommodation holes 21c and 22c of the frame 20 in such a manner that the forming direction of each of the two collectors 12 (more specifically, the metal laths RM) coincides with the direction of arrangement of the paired gas inlet 11a and gas outlet 11b of the corresponding separator body 11 to be superposed; i.e., the flow direction of gas introduced into the collector 12.

In a state where the two collectors 12 are accommodated in the respective accommodation holes 21c and 22c of the frame 20, the upper and lower separator bodies 11 are fixedly attached, for example, through application of adhesive. Since the resin sheet bodies 21 and 22 have a thickness slightly smaller than the forming height L of the two collectors 12, attachment of the separator bodies 11 causes the two collectors 12 to be slightly pressed against the MEA 30. Thus, a good state of contact is established between the two collectors 12 and the MEA 30 (more specifically, carbon cloth CC), as well as between the two collectors 12 and the corresponding separator bodies 11. A plurality of the thus-formed cells are stacked in accordance with required output, thereby yielding a fuel cell stack.

In the thus-configured fuel cell stack, as shown in FIG. 1, among the stacked cells, the gas inlets 11a of the separator bodies 11 communicate with one another through the through holes 21a or 22a of the frames 20, and the gas outlets 11b of the separator bodies 11 communicate with one another through the through holes 21b or 22b of the frames 20. Thus, hereinafter, a communication passageway formed by the gas inlets 11a of the separator bodies 11 and the through holes 21a or 22a of the frames 20 is called a gas supply inner-manifold, and a communication passageway formed by the gas outlets 11b of the separator bodies 11 and the through holes 21b or 22b of the frames 20 is called a gas discharge inner-manifold.

When fuel gas or oxidizer gas is externally supplied through the gas supply inner-manifold, the supplied fuel gas or oxidizer gas is introduced into each of the gas flow spaces. The thus-introduced fuel gas or oxidizer gas uniformly diffuses and flows throughout the gas flow space by virtue of the collector 12.

Specifically, gas which is introduced into each of the gas flow spaces from the gas supply inner-manifold flows toward the gas discharge inner-manifold while contacting the collector 12 disposed in the gas flow space. As mentioned previously, the collector 12 is formed from the metal lath RM in which a large number of hexagonal through holes are formed in a meshy, step-like arrangement. More specifically, a large number of hexagonal through holes of the metal lath RM are in a staggered arrangement in relation to a gas flow direction.

Thus, a flow of gas in the gas flow space becomes a turbulent flow as a result of the gas passing through the hexagonal through holes formed in the collector 12; i.e., the metal lath RM, in a staggered arrangement. Thus, gas introduced from the gas supply manifold diffuses uniformly in the gas flow space; in other words, a gas concentration gradient becomes uniform. By virtue of a uniform gas concentration gradient in the gas flow space and passage of gas through the carbon cloth CC, fuel gas and oxidizer gas are supplied uniformly to the anode electrode AE and the cathode electrode layer CE, respectively.

Figure 6:
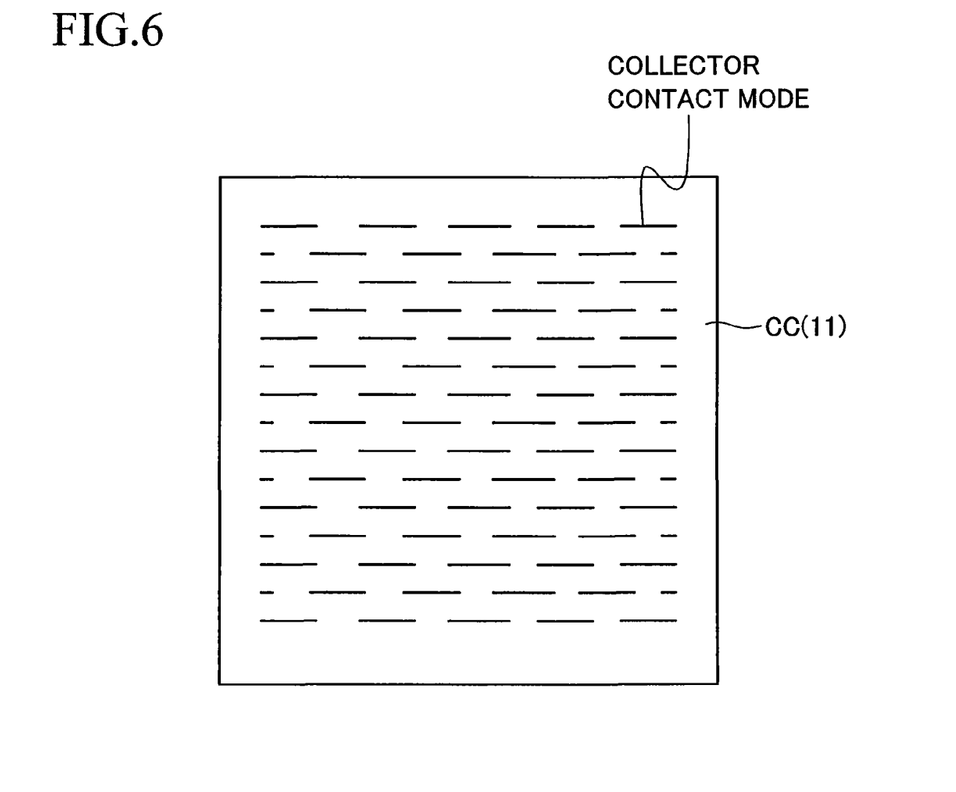
FIG. 6 is a view for explaining a contact mode between the collector and each of the MEA and the separator body.

Meanwhile, the collector 12 which partially forms a single cell contacts the carbon cloth CC at bond portions of the metal lath RM; more specifically, bond portions each serving as one side of individual hexagonal through holes formed in a step-like arrangement (hereinafter, bond portions which come into contact with the carbon cloth CC are called first bond portions as shown in FIG. 3A). As a result, as shown in FIG. 6, a contact mode between the collector 12 and the carbon cloth CC becomes substantially linear, whereby the total area of contact portions (contact area) between the collector 12 and the carbon cloth CC can be made necessary minimum.

Establishing a necessary minimum contact area between the collector 12 and the carbon cloth CC increases the area of contact between the carbon cloth CC and uniformly diffused fuel gas or oxidizer gas in the gas flow space (gas contact area). In other words, when the collector 12 is superposed on the carbon cloth CC, the total surface area of portions of the carbon cloth CC covered with contact portions of the collector 12 can be made small.

Thus, there can be increased the amount of fuel gas or oxidizer gas to be supplied to the anode electrode layer AE or the cathode electrode layer CE through the carbon cloth CC. This improves gas supply efficiency and thus improves the efficiency of electrode reactions in the MEA 30. Since gas can be supplied efficiently, unreacted gas which is discharged to the exterior of the fuel cell stack without being supplied to the MEA 30 can be reduced. Therefore, the fuel cell can generate electricity efficiently.

A contact area between the collector 12 and the carbon cloth CC is set so as to lower resistance associated with collection of electricity generated through electrode reactions in the MEA 30 (hereinafter, this resistance is called electricity collection resistance) for improving electricity collection efficiency. Specifically, reducing the contact area increases the gas contact area of the carbon cloth CC. As a result, electricity generation efficiency of the fuel cell is improved; however, electricity collection efficiency drops, since flow of electricity from the carbon cloth CC to the collector 12 is hindered with a resultant increase in electricity collection resistance. By contrast, increasing the contact area lowers electricity collection resistance and thus improves electricity collection efficiency; however, electricity generation efficiency of the fuel cell drops, since the gas contact area of the carbon cloth CC is reduced.

Therefore, the contact area between the collector 12 and the carbon cloth CC is set so as to improve electricity generation efficiency of the fuel cell and electricity collection efficiency in a balanced manner. The contact area can be readily adjusted by means of, for example, changing as appropriate the length of the first bond portions of the metal lath RM (i.e., the collector 12).

The collector 12 contacts the separator body 11 at bond portions of the metal lath RM which are located on a side opposite the corresponding first bond portions (hereinafter, bond portions which come into contact with the separator body 11 are called second bond portions as shown in FIG. 3A). Thus, as shown in FIG. 6, a contact mode between the collector 12 and the separator body 11 also becomes substantially linear.

The collector 12 and the separator body 11 are formed from a stainless steel sheet having good electrical conductivity. Thus, substantially linear contact between the collector 12 and the separator body 11 can secure a necessary and sufficient contact area therebetween. As a result, resistance associated with flow of electricity from the collector 12 to the separator body 11 (hereinafter, this resistance is called contact resistance) can be lowered sufficiently. Therefore, electricity collected by the collector 12 can be supplied to the separator body 11 efficiently. This allows efficient output of generated electricity to, for example, an unillustrated external circuit connected to the separator body 11.

As can be understood from the above description, the present embodiment allows the collector 12 to be formed from the metal lath RM in which hexagonal through holes are formed in a meshy, step-like arrangement. This enhances gas supply efficiency in terms of supply of fuel gas or oxidizer gas to the MEA 30 and allows improved efficiency in collection of electricity generated through electrode reactions in the MEA 30.

That is, by means of forming the collector 12 from the metal lath RM in which hexagonal through holes are formed, a contact mode between the collector 12 and the anode electrode layer AE or the cathode electrode layer CE; more specifically, a contact mode between the collector 12 and the carbon cloth CC can be substantially linear. This increases a gas contact area between supplied gas and the carbon cloth CC, thereby allowing sufficient supply of gas required for electrode reactions in the anode electrode layer AE and the cathode electrode layer CE. Furthermore, since a necessary and sufficient contact area between the carbon cloth CC and the collector 12 can be secured, electricity collection resistance can be lowered.

Electricity generated in the MEA 30 flows from the carbon cloth CC to the collector 12 and is then output from the collector 12 to the exterior of the fuel cell via the separator body 11. At this time, since a contact mode between the collector 12 and the carbon cloth CC and that between the collector 12 and the separator body 11 are substantially linear, a necessary and sufficient contact area can be secured. This lowers contact resistance, so that electricity can be collected efficiently, and electricity can be output efficiently.

Since a contact area between the collector 12 and the carbon cloth CC and that between the collector 12 and the separator body 11 can be secured appropriately, there is no need to employ gold plating for improving electrical conductivity. This allows very inexpensive formation (manufacture) of the collector 12, thereby lowering the cost of manufacturing the fuel cell.

In order to allow passage of gas, the collector 12 does not need to have, for example, streaky recesses and projections for forming a gas passageway. Thus, the collector 12 (i.e., the metal lath RM) can be formed very easily, thereby enhancing productivity. Since formation of a gas passageway is not necessary, the thickness of the collector 12 can be reduced. This reduces the thickness of a single cell, thereby implementing a small-sized fuel cell.

In the above-described embodiment, the collector 12 is formed from the metal lath RM in which hexagonal through holes are formed in a meshy, step-like arrangement. The shape of individual through holes formed in the metal lath is not limited to hexagon so long as employment of the shape enhances gas supply efficiency and lowers electricity collection resistance and contact resistance. Next will be described modified embodiments which employ metal laths having modified shapes of through holes. In the description of the modified embodiments, like parts of the modified embodiments and the above-described embodiment are denoted by like reference numerals, and repeated description thereof is omitted.

Figure 7A:
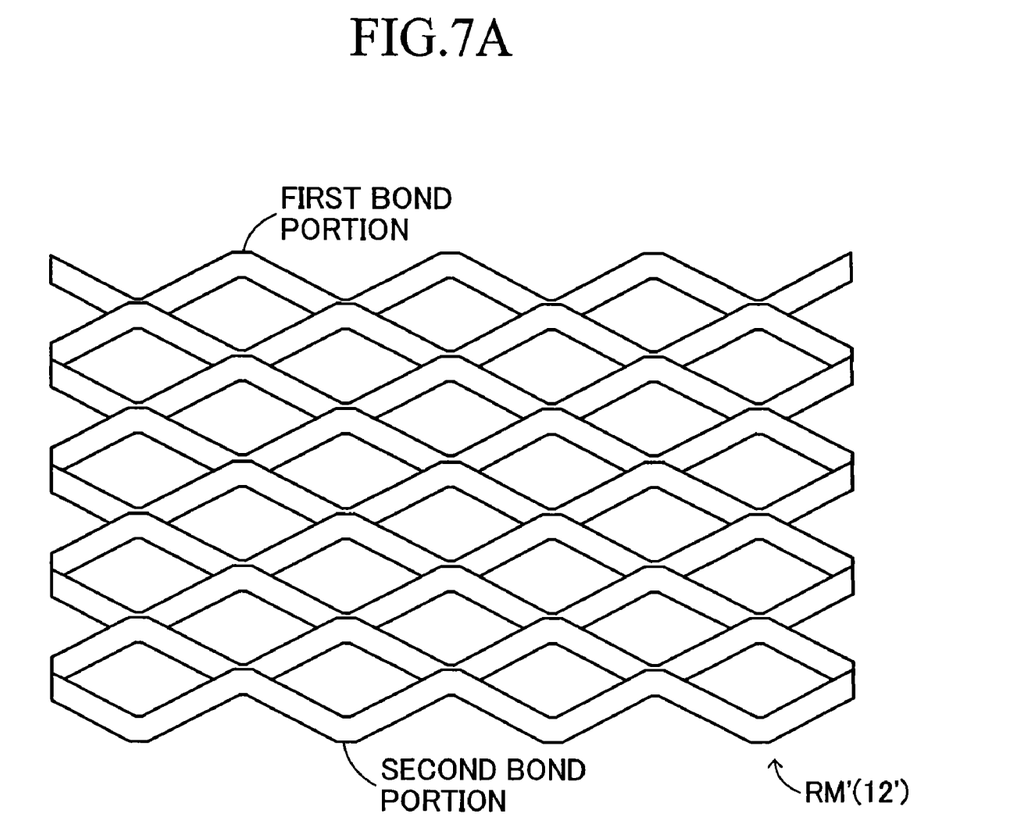
FIGS. 7A and 7B are views for explaining a metal lath used to form a collector according to a first modified embodiment of the collector shown in FIG. 1.

As shown in FIG. 7A, through holes formed in the metal lath can each have, for example, a diamond shape (quadrangular shape). Next will be described a first modified embodiment which employs a metal lath having through holes each having a diamond shape. A metal lath RM' having through holes each having a diamond shape (hereinafter, these through holes are called diamond through holes) is formed also by use of, for example, the lath machining apparatus A used in the above-described embodiment. However, in formation of the metal lath RM', the upper blade UH of the blade stamp H differs in cutting-edge shape from the above-described embodiment.

Specifically, in the first modified embodiment, the cutting edge of the upper blade UH has a plurality of angular crests and angular bottoms (generally triangular shapes) corresponding to a diamond shape which is imparted to through holes to be formed. Also, in the first modified embodiment, the lath machining apparatus A operates as follows. The feed roller OR feeds the stainless steel sheet S by a machining pitch. The upper blade UH, which moves horizontally and vertically, partially shears the stainless steel sheet S so as to form cuts in the stainless steel sheet S in a staggered arrangement, and bends and expands a portion of the stainless steel sheet S which is in contact therewith. Generally triangular shapes are transferred to the bent and expanded portion of the stainless steel sheet S. Repeating the above-mentioned operations forms continuously the metal lath RM' in which a large number of diamond through holes are formed in a staggered arrangement; i.e., in a meshy, step-like arrangement.

Figure 7B:
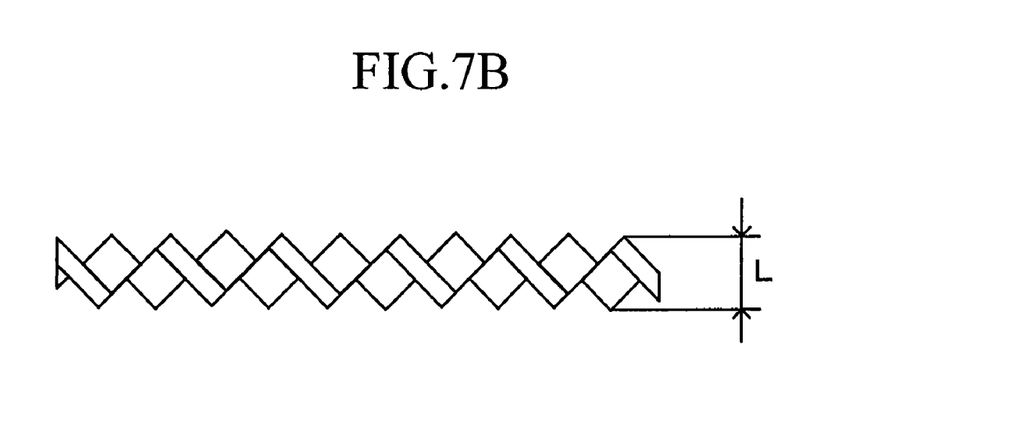

In the first modified embodiment, the cutting edge of the upper blade UH has a plurality of angular crests and angular bottoms, whereby the angular bottoms are adapted to form bond portions. That is, bond portions are formed at apex portions of diamond through holes of the metal lath RM'. Thus, strands are sequentially linked in an overlapping manner, whereby the metal lath RM' is formed such that its cross section has a step-like shape as shown in FIG. 7B. The metal lath RM' is cut so as to have predetermined dimensions, thereby forming a collector 12'. As in the case of the above-described embodiment, the thus-formed collectors 12' are accommodated in the corresponding accommodation holes 21c and 22c of the frame 20, thereby yielding a single cell.

Also, in the first modified embodiment, when gas is supplied into the gas flow space through the gas supply innermanifold, the supplied gas uniformly diffuses and flows throughout the gas flow space by virtue of the collector 12'. As in the case of the above-described embodiment, the supplied gas flows in the gas flow space while contacting the collector 12'. Thus, a flow of gas in the gas flow space becomes a turbulent flow as a result of the gas passing through the diamond through holes formed in the collector 12' in a staggered arrangement. Thus, the gas diffuses uniformly in the gas flow space. As in the case of the above-described embodiment, the gas which has passed through the carbon cloth CC is supplied uniformly to each of the anode electrode layer AE and the cathode electrode layer CE.

Figure 8:
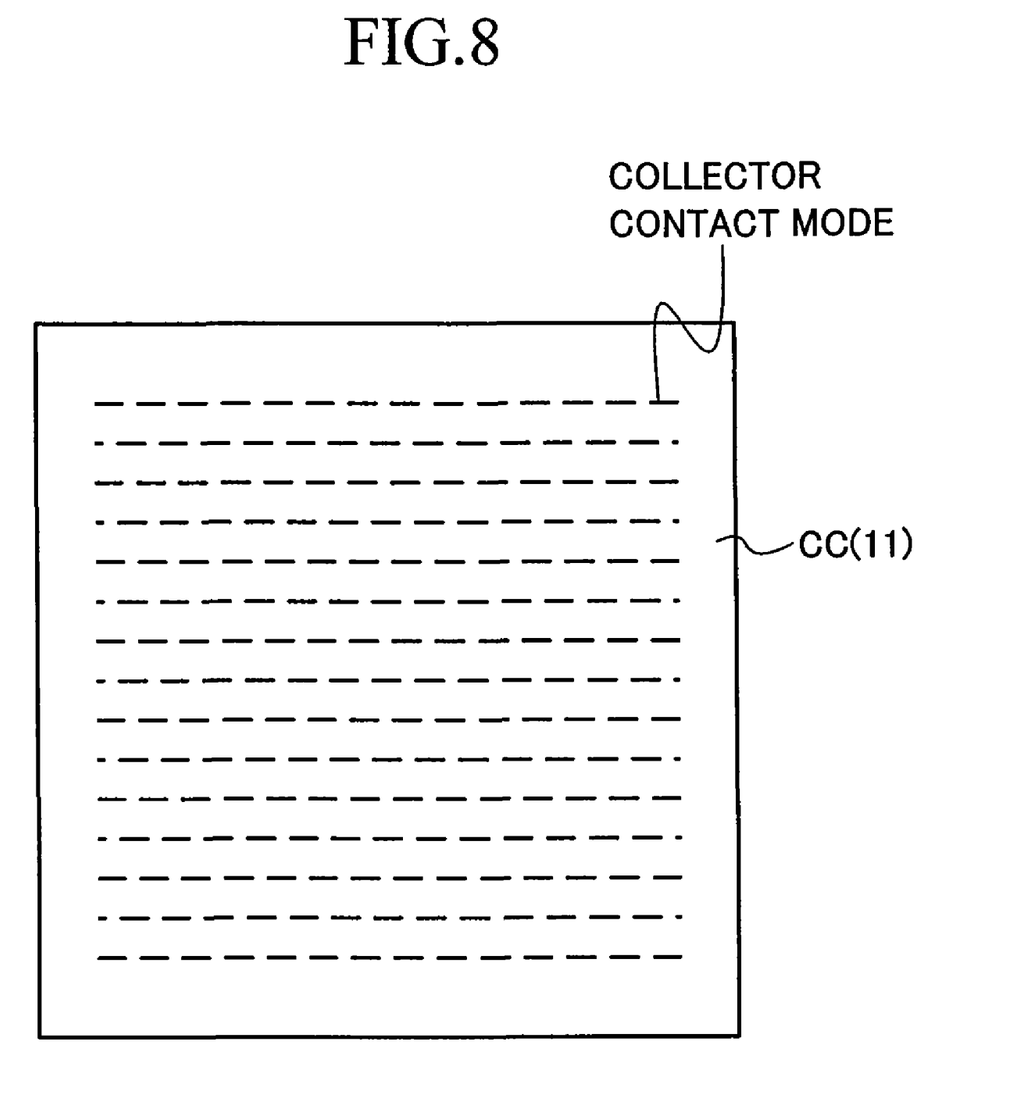
FIG. 8 is a view for explaining a contact mode between the collector and each of the MEA and the separator body in the first modified embodiment.

Furthermore, the collector 12' of the first modified embodiment contacts the carbon cloth CC at the first bond portions of the metal lath RM'; i.e., at bond portions serving as respective apex portions of individual diamond through holes formed in a step-like arrangement as shown in FIG. 7A. As a result, as shown in FIG. 8, a contact mode between the collector 12' and the carbon cloth CC becomes virtually dot-like, whereby a contact area between the collector 12' and the carbon cloth CC becomes smaller than that of the above-described embodiment.

Reducing the contact area as mentioned above increases accordingly a gas contact area between the carbon cloth CC and gas which is diffused uniformly in the gas flow space. This greatly improves gas supply efficiency in terms of supply of gas to the anode electrode layer AE or the cathode electrode layer CE through the carbon cloth CC. This improves efficiency in electrode reactions in the MEA 30 and reduces unreacted gas to be discharged. Therefore, the fuel cell can generate electricity very efficiently.

However, as mentioned in the above description of the embodiment, when a contact area between the collector 12' and the carbon cloth CC is reduced, electricity collection resistance increases accordingly. In order to cope with this, in the first modified embodiment, portions of the collector 12' which come into contact with the carbon cloth CC are, for example, plated with gold so as to lower electricity collection resistance between the collector 12' and the carbon cloth CC. This greatly improves electrical conductivity; in other words, electricity collection resistance can be lowered greatly. Therefore, generated electricity can be output efficiently to the exterior of the fuel cell.

A contact mode at the second bond portions between the collector 12' shown in FIG. 7A and the separator body 11 is also virtually dot-like, thus raising concern about an increase in contact resistance. However, since the collector 12' and the separator body 11 are both formed from a stainless steel sheet having good electrical conductivity, contact portions between the collector 12' and the separator body 11 can be free from application of gold plating. In this case, in order to further lower contact resistance, for example, the collector 12' and the separator body 11 can be joined together.

Thus, as in the case of the above-described embodiment, in the first modified embodiment which employs the collector 12', gas supply efficiency and electricity collection efficiency can be improved in a balanced manner. Thus, the first modified embodiment can be expected to yield effects similar to those of the above-described embodiment. In order to improve electrical conductivity of the collector 12', the first modified embodiment requires application of, for example, gold plating to the collector 12'. This possibly raises the cost of manufacturing the fuel cell as compared with the above-described embodiment. However, as compared with, for example, the conventional fuel cell which employs a porous metal, the cost of manufacturing the collector 12' can be lowered greatly. Therefore, the fuel cell can be manufactured at low cost.

In the above-described first modified embodiment, the collector 12' is formed from the metal lath RM' in which diamond through holes are formed in a meshy, step-like arrangement. In place of the metal lath RM', a metal lath RM" in which through holes each have a generally pentagonal shape can be employed. Next will be described a second modified embodiment which employs the metal lath RM".

Figure 9A:
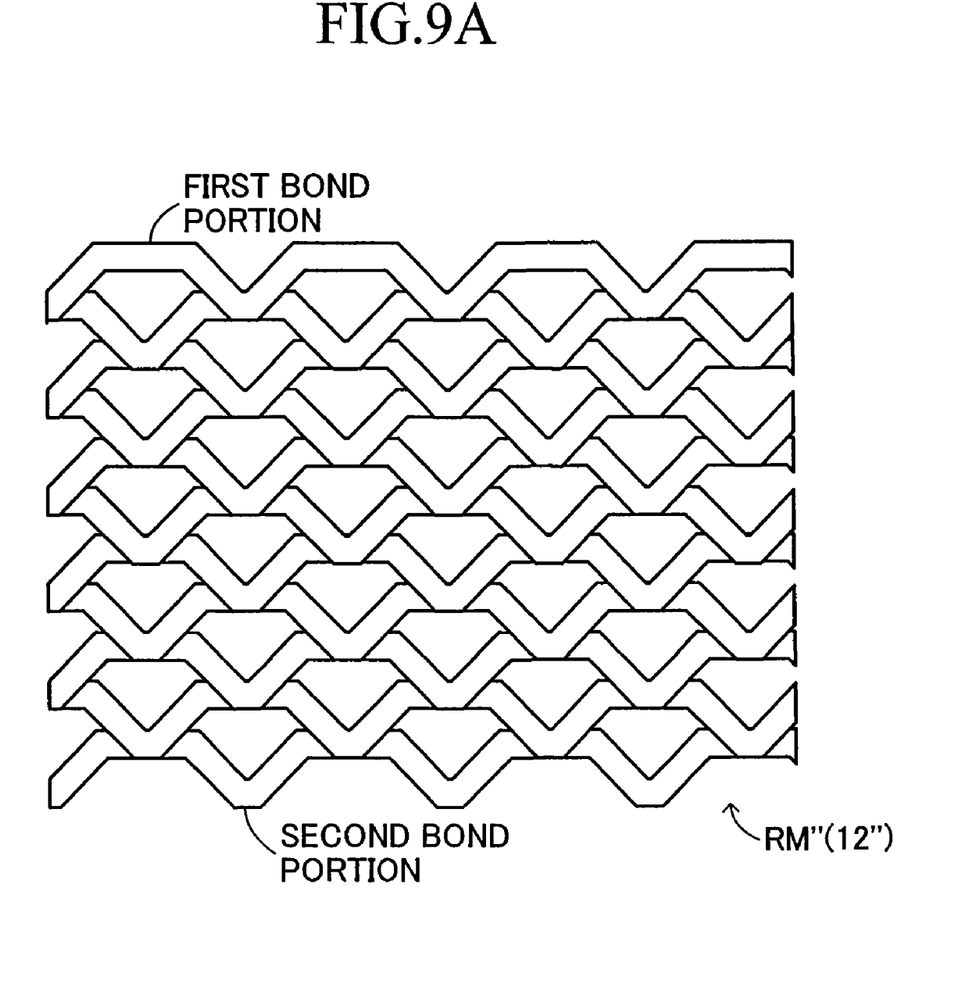
FIGS. 9A and 9B are views for explaining a metal lath used to form a collector according to a second modified embodiment of the collector shown in FIG. 1.

As shown in FIG. 9A, the metal lath RM" of the second modified embodiment has through holes which each have a generally pentagonal shape and which are formed in a meshy, step-like arrangement (hereinafter, the through holes each having a pentagonal shape are called pentagonal through holes). This metal lath RM" is formed also by use of, for example, the lath machining apparatus A. However, in formation of the metal lath RM", the upper blade UH of the blade stamp H differs in cutting-edge shape from the above-described embodiment and first modified embodiment.

In the second modified embodiment, the cutting edge of the upper blade UH has a shape corresponding to a pentagonal shape which is imparted to through holes to be formed. Specifically, for example, the cutting edge of the upper blade UH has a plurality of generally trapezoidal shapes as in the above-described embodiment or a plurality of generally triangular shapes as in the above-described first modified embodiment.

Also, in the second modified embodiment, the lath machining apparatus A operates as follows. The feed roller OR feeds the stainless steel sheet S by a machining pitch. The upper blade UH, which moves horizontally and vertically, partially shears the stainless steel sheet S so as to form cuts in the stainless steel sheet S in a staggered arrangement, and bends and expands a portion of the stainless steel sheet S which is in contact therewith. Generally trapezoidal shapes are transferred to the bent and expanded portion of the stainless steel sheet S. As compared with the above-described first modified embodiment, when the upper blade UH has a generally triangular shape, the amount of bending and expanding the stainless steel sheet S is set smaller. Repeating the above-mentioned operations forms continuously the metal lath RM" in which a large number of pentagonal through holes are formed in a staggered arrangement; i.e., in a meshy, step-like arrangement.

Figure 9B:
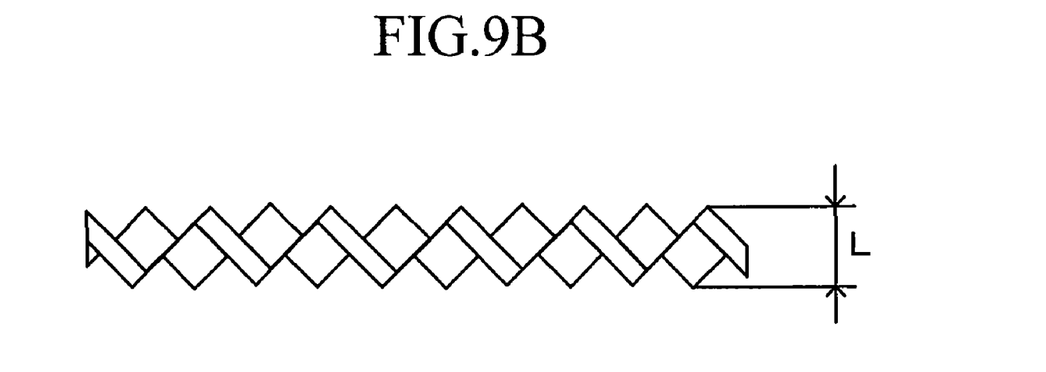

In the second modified embodiment, the cutting edge of the upper blade UH has a plurality of generally trapezoidal or triangular shapes, whereby angular bottoms are adapted to form bond portions. Specifically, in the second modified embodiment, as shown in FIG. 9A, one side of each of formed pentagonal through holes and an apex in opposition to the side of the pentagonal through hole serve as respective bond portions. Thus, strands are sequentially linked in an overlapping manner, whereby the metal lath RM" is formed such that its cross section has a step-like shape as shown in FIG. 9B. The metal lath RM" is cut so as to have predetermined dimensions, thereby forming a collector 12". As in the case of the above-described embodiment, the thus-formed collectors 12" are accommodated in the corresponding accommodation holes 21c and 22c of the frame 20, thereby yielding a single cell.

Also, in the second modified embodiment, when gas is supplied into the gas flow space through the gas supply inner-manifold, the supplied gas uniformly diffuses and flows throughout the gas flow space by virtue of the collector 12". As in the case of the above-described embodiment, the supplied gas flows in the gas flow space while contacting the collector 12". Thus, a flow of gas in the gas flow space becomes a turbulent flow as a result of the gas passing through the pentagonal through holes formed in the collector 12" in a staggered arrangement. Thus, the gas diffuses uniformly in the gas flow space. As in the case of the above-described embodiment, the gas which has passed through the carbon cloth CC is supplied uniformly to each of the anode electrode layer AE and the cathode electrode layer CE.

In the collector 12" of the second modified embodiment, as shown in FIG. 9A, one side of each of the pentagonal through holes can serve as each of the first bond portions of the metal lath RM" which comes into contact with the carbon cloth CC. In other words, a contact mode between the collector 12" and the carbon cloth CC can be substantially linear. Thus, as in the case of the above-described embodiment, a contact area between the collector 12" and the carbon cloth CC can be secured appropriately, thereby lowering electricity collection resistance. More specifically, in the case where the pentagonal through holes are equivalent in an opening size (mesh size) to, for example, the hexagonal through holes, the first bond portions of the collector 12" become longer in segment length than the first bond portions of the collector 12. Accordingly, there can be secured a greater contact area between the collector 12" and the carbon cloth CC.

Meanwhile, in the collector 12" which contacts the carbon cloth CC at one side of each of the pentagonal through holes as mentioned above, as shown in FIG. 9A, an apex portion of each of the pentagonal through holes can serve as each of the second bond portions of the metal lath RM" which comes into contact with the separator body 11. In this case, the collector 12" (i.e., metal lath RM") and the separator body 11 are both formed from a stainless steel sheet having good electrical conductivity. Thus, even though a contact mode between the collector 12" and the separator body 11 becomes dot-like, a rise in contact resistance can be suppressed; thus, there is no need to employ, for example, gold plating for improving electrical conductivity. Also, in this case, in order to further lower contact resistance, for example, the collector 12" and the separator body 11 can be joined together. Accordingly, gas supply efficiency can be improved, and electricity collection efficiency can be improved as well. Furthermore, since employment of gold plating for improving electrical conductivity can be avoided, the collector 12" can be formed at very low cost as in the case of the above-described embodiment. Therefore, the cost of manufacturing the fuel cell can be reduced greatly.

Figure 10:
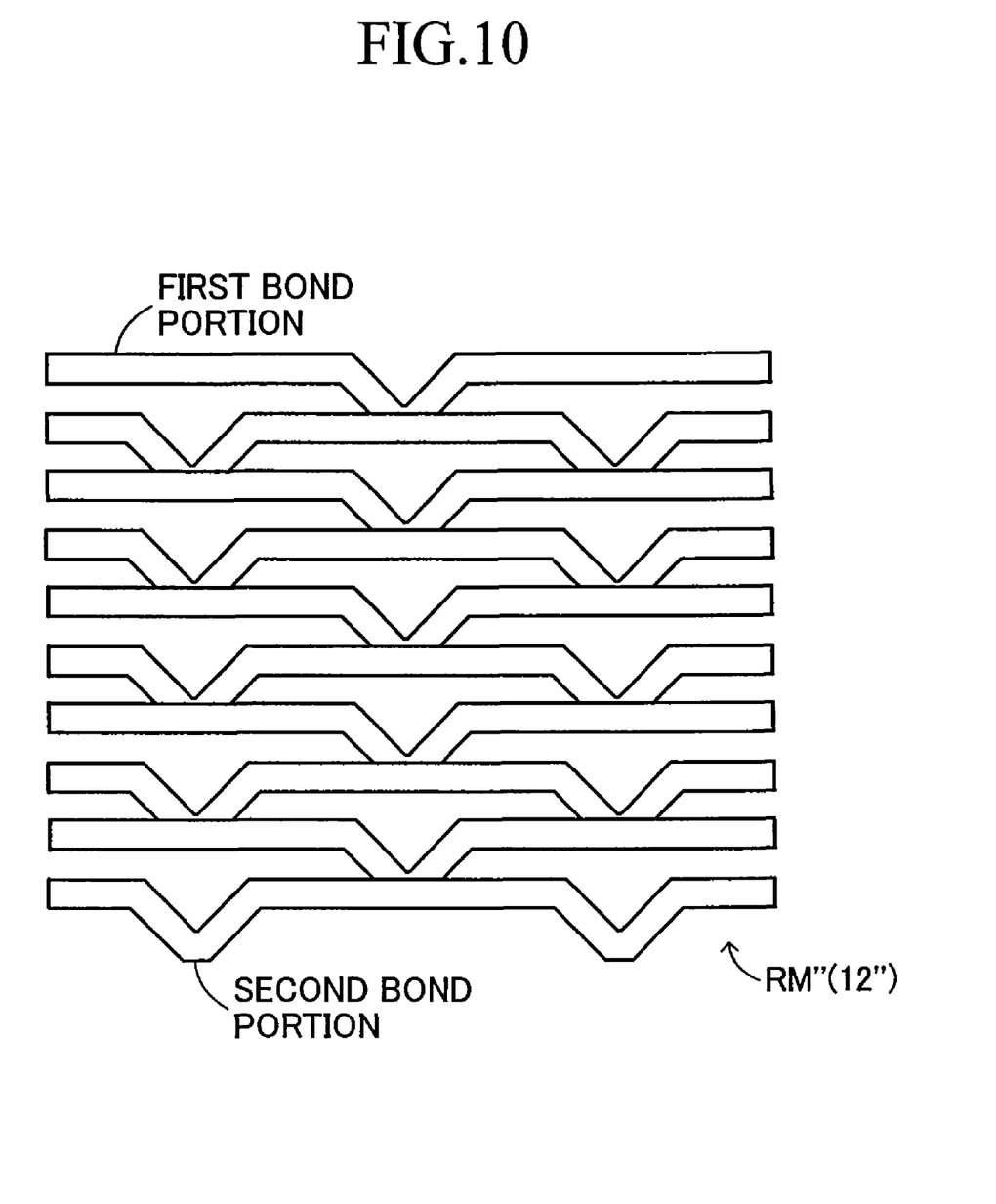
FIG. 10 is a view for explaining a metal lath used to form a variant of the collector according to the second modified embodiment of the collector shown in FIG. 1.

The metal lath RM" employed in the second modified embodiment has pentagonal through holes each having a virtually pentagonal shape. Alternatively, as shown in FIG. 10, the metal lath RM" can have polygonal through holes whose first bond portions are elongated. This greatly increases a contact area between the collector 12" and the carbon cloth CC, thereby lowering electricity collection resistance to a greater extent.

The present invention is not limited to the above-described embodiment and first and second modified embodiments, but may be embodied in various other forms without departing from the scope of the invention.

For example, in the above-described embodiment and first and second modified embodiments, the collector (12, 12', 12") is formed from a single metal lath (RM, RM', RM"). The thus-formed collectors (12, 12', 12") are accommodated in the respective accommodation holes 21c and 22c of the frame 20. Alternatively, a plurality of metal laths (RM, RM', RM") can be stacked to form the collector (12, 12', 12"). In this case, of course, the thickness of the resin sheet body 21 of the frame 20 is changed in accordance with the number of metal laths (RM, RM', RM") to be stacked.

In the case where the collector (12, 12', 12") is formed from a stack of metal laths (RM, RM', RM"), the height of the gas flow space increases accordingly, thereby increasing the amount of fuel gas or oxidizer gas which is supplied to the gas flow space from the gas supply inner-manifold. Even in such a case where the amount of fuel gas or oxidizer gas to be supplied is increased, a flow of gas in the gas flow space can become a turbulent flow by virtue of the collector (12, 12', 12"). This enhances gas supply efficiency, thereby improving electricity generation efficiency of the fuel cell.

Even in the case where the collector (12, 12', 12") is formed from a stack of metal laths (RM, RM', RM"), a contact mode between the collector (12, 12', 12") and the carbon cloth CC and that between the collector (12, 12', 12") and the separator body 11 are similar to those of the above-described embodiment and modified embodiments. This improves electricity collection efficiency. Therefore, even in this case, gas supply efficiency and electricity collection efficiency can be improved in a balanced manner.

In the case where the collector (12, 12', 12") is formed from a stack of metal laths (RM, RM', RM"), the metal laths (RM, RM', RM") can differ in the ratio of total opening area of through holes to a surface area (i.e., opening percentage). By means of stacking the metal laths (RM, RM', RM") of different opening percentages, gas supply and a contact area between the collector (12, 12', 12") and each of the anode electrode layer AE and the cathode electrode layer CE (more specifically, the carbon cloth CC) can be readily changed. Therefore, the contact area and the gas supply can be optimized in accordance with required specifications of the fuel cell.

INDUSTRIAL APPLICABILITY

The present invention can be applied to a separator for use in a fuel cell.

The invention claimed is:
1. A separator for a fuel cell for supplying fuel gas and oxidizer gas to respective electrode layers of an electrode structure of the fuel cell and for collecting electricity generated through electrode reactions in the electrode layers, the separator comprising:

a flat-sheet-like separator body formed from an electrically conductive material for preventing mixed flow of the fuel gas and the oxidizer gas, through separation of the fuel gas and the oxidizer gas from each other;

a collector formed from a metal lath, which has a large number of through holes, each having a predetermined opening shape along a plane of the collector and having a stepped configuration in cross section to enable the fuel gas or the oxidizer gas to diffuse along a planar direction of the collector, the through holes continuously repeating in a predetermined offset pitch forming a gas passageway, between the separator body and each of the electrode layers for supplying the fuel gas or the oxidizer gas to the electrode layer, and for collecting electricity generated through electrode reactions in the electrode layers; and a layer for diffusing the oxidizer gas or the fuel gas, said layer being disposed between each of the collector and the electrode layer and comprising electrically conductive carbon fiber.

2. The separator for a fuel cell according to claim 1, wherein a contact area between the collector and the electrode layer is equal to or greater than a contact area between the collector and the separator body.

3. The separator for a fuel cell according to claim 1, wherein a plurality of metal laths are stacked to form the collector.

4. The separator for a fuel cell according to claim 3, wherein the plurality of metal laths to be stacked differ in the ratio of total opening area of through holes to a surface area.

5. The separator for a fuel cell according to claim 1, wherein the collector forms the gas passageway such that a flow direction of the fuel gas or the oxidizer gas to be supplied coincides with a forming direction of the metal lath.

6. The separator for a fuel cell according to claim 1, wherein the predetermined opening shape of the individual through holes of the collector is hexagon.

7. The separator for a fuel cell according to claim 1, wherein a contact state between the collector and the electrode layer is linear or dot-like.

8. The separator for a fuel cell according to claim 2, wherein a plurality of metal laths are stacked to form the collector.

9. The separator for a fuel cell according to claim 2, wherein the collector forms the gas passageway such that a flow direction of the fuel gas or the oxidizer gas to be supplied coincides with a forming direction of the metal lath.

10. The separator for a fuel cell according to claim 2, wherein the predetermined opening shape of the individual through holes of the collector is hexagon.

11. The separator for a fuel cell according to claim 1, wherein the predetermined offset pitch is half a pitch in a horizontal direction.

* * * * *